No. 897,567. PATENTED SEPT. 1, 1908.
A. C. WOOD.
TURBINE.
APPLICATION FILED FEB. 21, 1908.

3 SHEETS—SHEET 1.

Witnesses:
Inventor:
Arthur C. Wood,
By
Atty.

No. 897,567.

PATENTED SEPT. 1, 1908.

A. C. WOOD.
TURBINE.
APPLICATION FILED FEB. 21, 1908.

3 SHEETS—SHEET 2.

Witnesses
G. A. Pauberschmidt
L. J. Dumais.

Inventor:
Arthur C. Wood,
By Geo. E. Waldo,
Atty

No. 897,567. PATENTED SEPT. 1, 1908.
A. C. WOOD.
TURBINE.
APPLICATION FILED FEB. 21, 1908.
3 SHEETS—SHEET 3.
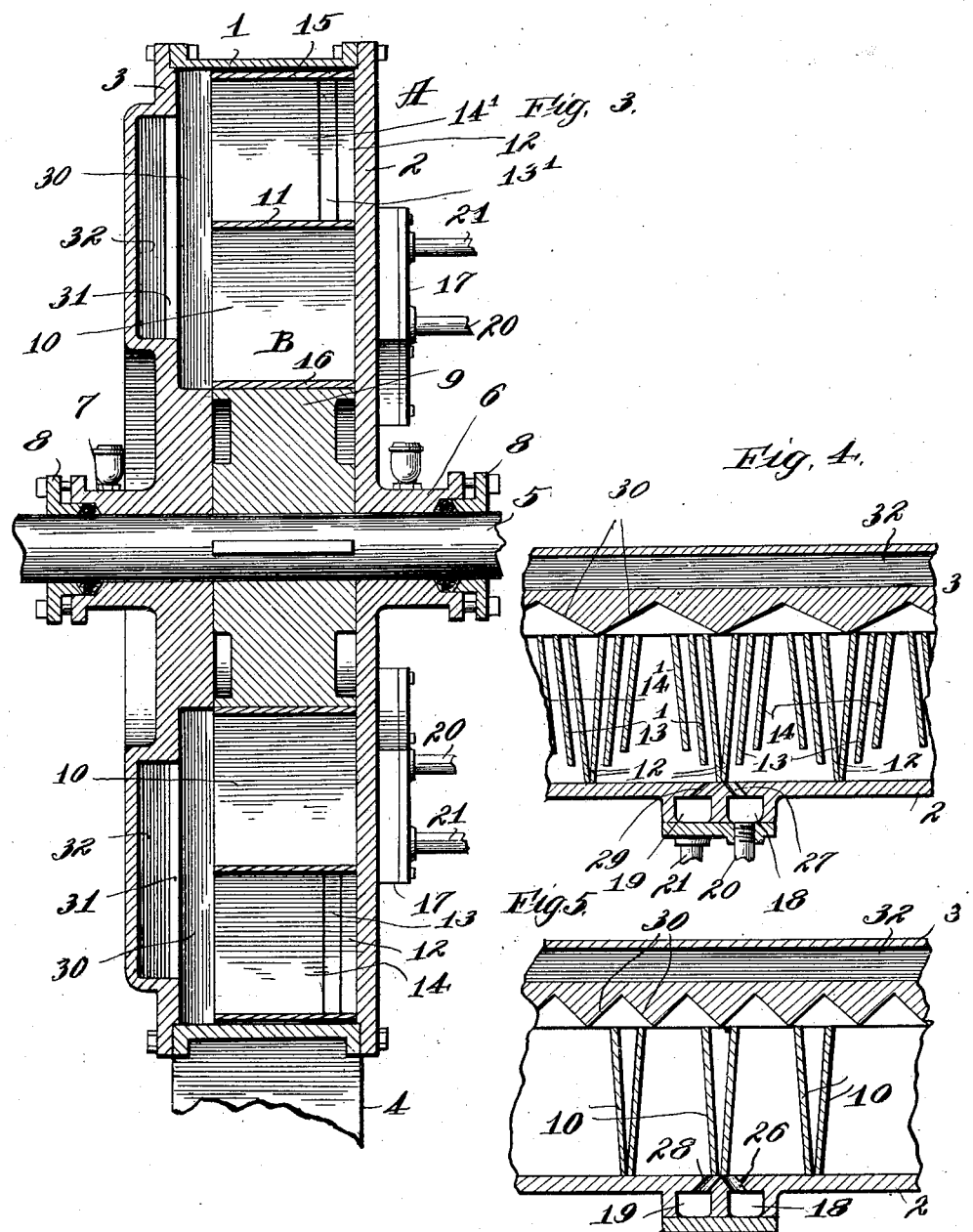
Witnesses:
G. A. Fauberschmidt
L. J. Dumais.
Inventor:
Arthur C. Wood,
By Geo. E. Waldo,
Atty

UNITED STATES PATENT OFFICE.

ARTHUR C. WOOD, OF WAUKEGAN, ILLINOIS, ASSIGNOR OF ONE-HALF TO JUSTIN K. ORVIS, OF WAUKEGAN, ILLINOIS.

TURBINE.

No. 897,567.     Specification of Letters Patent.     Patented Sept. 1, 1908.

Application filed February 21, 1908. Serial No. 417,007.

*To all whom it may concern:*

Be it known that I, ARTHUR C. WOOD, a citizen of the United States, and a resident of Waukegan, in the county of Lake and State of Illinois, have invented certain new and useful Improvements in Turbine-Engines, of which the following is a specification.

This invention relates to turbine engines.

Speaking generally, the object of the invention is to provide a turbine engine, which will embody the features of simplicity of construction, strength and durability, cheapness of manufacture and efficiency in operation.

Specifically, the object of the invention is to provide a reversible turbine engine and one that will be equally efficient when running in either direction.

A turbine engine of my invention consists of the various features, combinations of features and details of construction hereinafter described and claimed.

Figure 1:
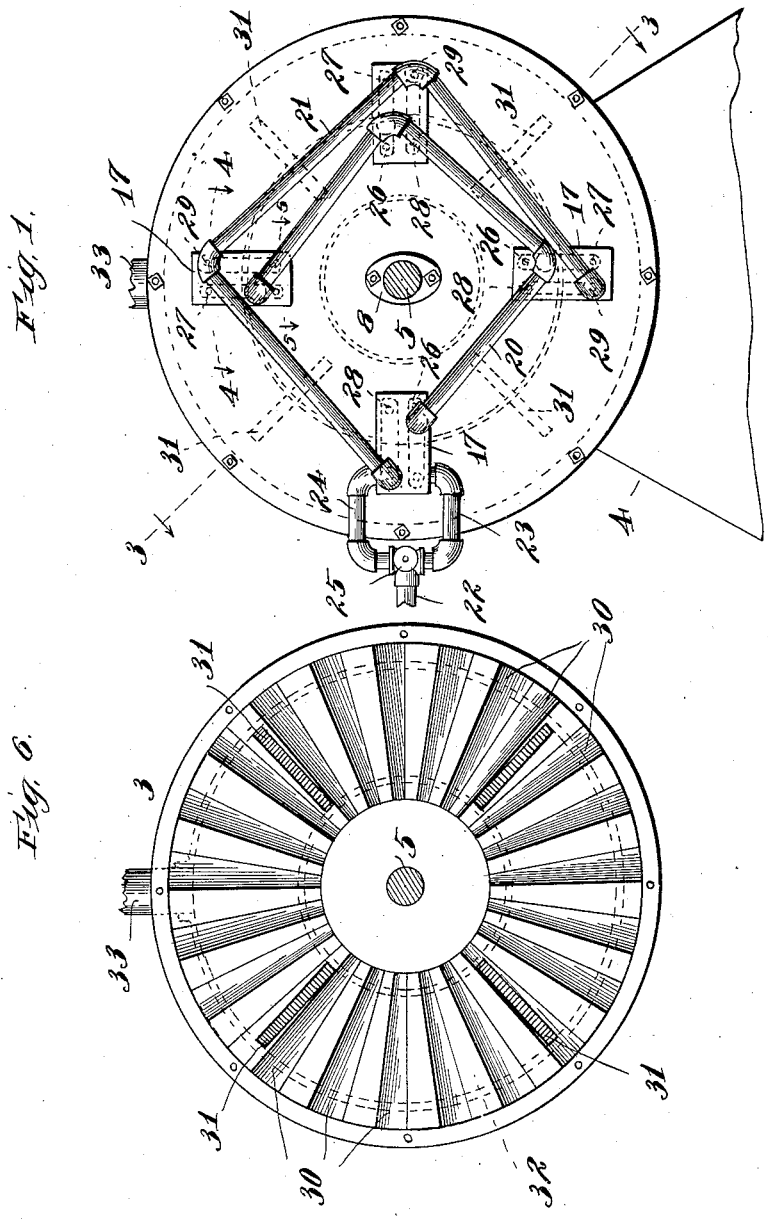
Figure 2:
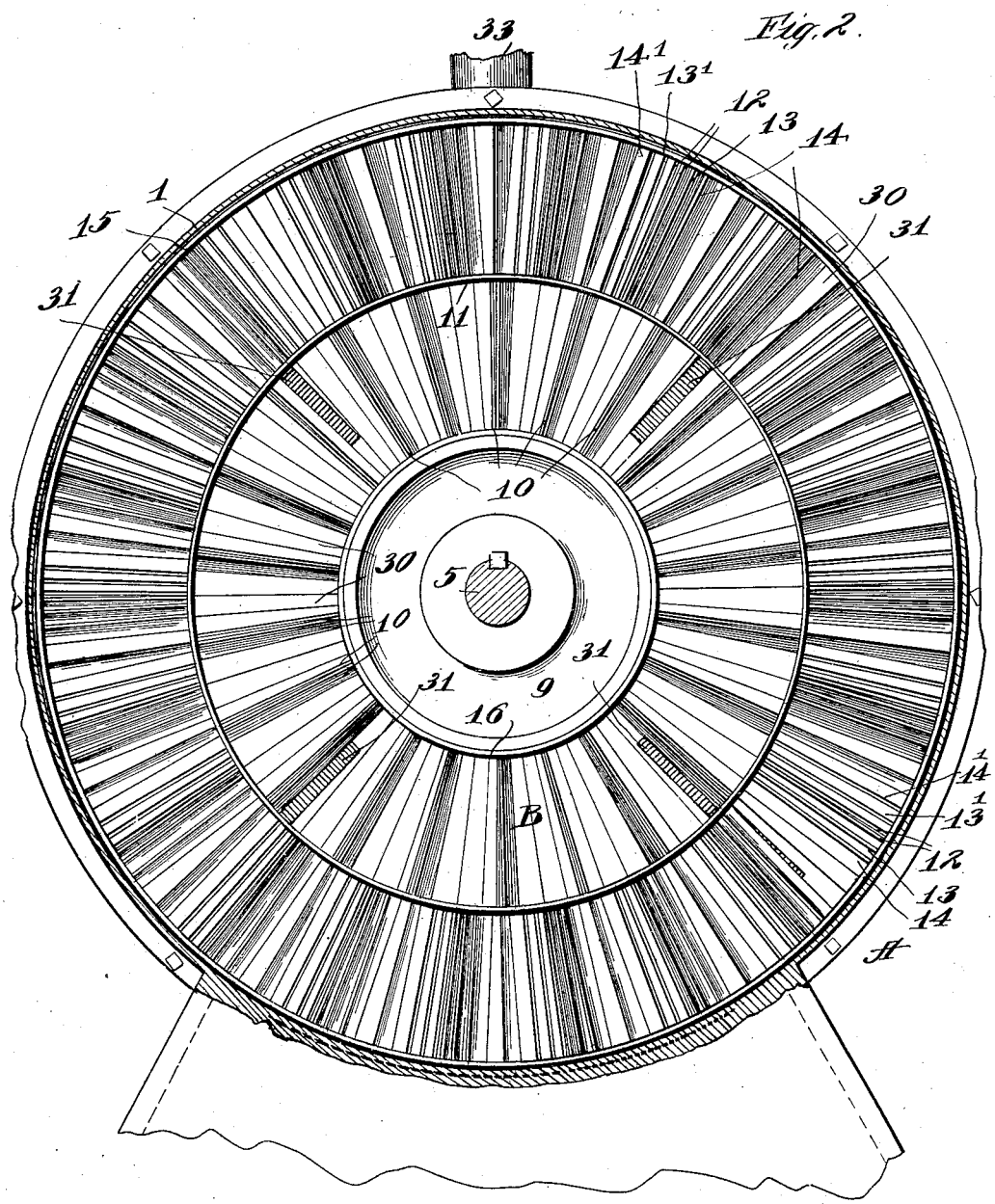

In the accompanying drawings, in which my invention is fully illustrated,—Figure 1 is a front view of my improved turbine engine. Fig. 2 is an enlarged view similar to Fig. 1, the front head of the engine casing being removed and the shell being shown in section. Fig. 3 is an enlarged sectional view taken substantially on the line 3—3 of Fig. 1. Figs. 4 and 5 are enlarged fragmentary sectional views on the lines 4—4 and 5—5, respectively, of Fig. 1; and Fig. 6 is a view of the inner surface of the rear head of the engine casing.

The casing of my improved engine, indicated as a whole by A, comprises a cylindrical shell 1, the sides or ends of which are closed by removable heads 2 and 3, which, for purposes of convenient reference will be referred to as front and rear heads, respectively.

The casing A forms the frame of the engine and is supported upon a suitable base 4. As shown, said base is formed integral with the shell, but may equally well be formed separate therefrom and bolted or otherwise rigidly secured thereto, preferably in such manner as not to interfere with securing the heads 2 and 3 in position and removing the same.

The shaft 5 of the engine is removably mounted in suitable bearings in the heads 2 and 3 concentric with the shell 1, bosses 6 and 7 being formed on said heads, respectively, to provide shaft bearings of desired length. The shaft bearings are packed by packing glands 8, in the usual manner.

Secured to rotate with the shaft 5 within the casing A, is a drum, indicated as a whole by B. The drum B comprises a central hub 9, keyed or otherwise secured directly to the shaft 5 so as to rotate therewith, and fitted to turn freely between suitable bearing surfaces on the heads 2 and 3, the fit being as close as consistent with perfect freedom of movement. The bearing surfaces on said heads 2 and 3 will operate, in an obvious manner, to secure and support the drum B against lateral movement or displacement against any forces applied thereto laterally, as the impact of the steam or other fluid used for driving the engine. The drum B also comprises vanes rigidly secured to the perimeter of the hub 9, and extending outwardly therefrom between the heads 2 and 3 of the casing A.

Owing to the angular divergence of the vanes outwardly from the hub 9, in order that, at a distance from said hub, said vanes may be disposed at proper intervals, say one inch apart, so that said drum B will receive impulses from the fluid jet or jets with necessary frequency to render the engine efficient, said vanes preferably comprise two or more series arranged one inside of the other concentric with the axis of the hub 9 and shaft 5. As shown, my improved engine comprises two such series.

At their inner edges, the vanes of the inner series, designated by 10, are connected to the hub 9 and their outer edges are connected to a ring or band 11 which operates to strengthen and support the same so that they will not become bent or distorted by the impact of the fluid used for driving the engine or from other cause. The vanes of the outer series are arranged in groups, comprising central vanes 12 which extend entirely across said drum, and vanes 13, 14, $13^1$ and $14^1$ at opposite sides of said central vanes, the vanes at opposite sides of said central vane terminating at successively shorter distances from the front head 2 of the engine casing. The vanes of said outer series are secured at their inner edges to the ring or band 11, and the outer edges thereof are connected by means of a ring or band 15 which will operate to strengthen and support said vanes and prevent the same from becoming bent and distorted. Obviously, while I have shown but two such series, they may be multiplied as desired for the purpose of increasing the power of the engine.

For convenience of construction, the vanes 10 of the inner series of vanes, instead of being secured directly to the hub 9, are secured to a ring or band 16 which fits closely over said hub 9 and is adapted to be secured thereto in any suitable manner, as by means of solder, rivets, bolts or the like. With this construction, it is obvious that the structure consisting of the vanes 10, 12, 13, 14, $13^1$ and $14^1$ and the rings 11, 15 and 16 may be assembled separately and then secured to the hub 9 as a unitary structure.

In order that the impulses imparted to the drum B may be continuous and uniform, as nearly as practicable, the vanes of different series are preferably located or disposed out of line with each other or in staggered relation. Also, while I have shown the vanes of the inner series as arranged singly and those of the outer series arranged in groups, it is obvious that this arrangement is immaterial and that the vanes of both series may be arranged either singly or in groups, as may be considered preferable.

The admission and exhaust connections for the steam or other fluid used for driving the engine are as follows:—Formed on the front head 2 of the engine casing are steam chests 17 in each of which are formed chambers 18 and 19 which extend substantially radially to said casing A, so that they will overlap both series of vanes, their opposite ends terminating preferably at about the centers of said series of vanes, respectively. The chambers 18 of each steam chest 17 are connected by pipes 20 and the chambers 19 by pipes 21 and the fluid for driving the engine is adapted to be supplied thereto through a pipe 22 provided with branches 23 and 24 which communicate with the chambers 18 and 19, respectively, of one of the steam chests 17 and which is controlled by means of a three-way cock 25, whereby fluid may be admitted to one or the other of said chambers as may be desired. The chambers 18 are provided with ports or jet openings 26 and 27 and the chambers 19 with ports or jet openings 28 and 29. The ports 26 and 27 are preferably located substantially centrally of the inner and outer series of vanes, respectively, and are all disposed at angles so that the jets of steam or other fluid therefrom will be projected against one side of the vanes. The ports 28 and 29 are likewise located substantially centrally of the different series of vanes and are inclined oppositely to the ports 26 and 27 at substantially the same angle so that the jets of steam therefrom will be projected against the opposite sides of the vanes from the jets from the ports 26 and 27. As shown, said ports are inclined at angles of about forty-five degrees. In order that the jets from said ports may strike the sides of the vanes more nearly at right angles, the sides or surfaces of said vanes against which said jets impinge are preferably disposed angularly, as best shown in Figs. 4 and 5.

With the described construction, it is obvious that by turning the valve 25 so as to admit steam to one or the other of the series of chambers 18 or 19, the engine will be rotated in one direction or the other under substantially similar conditions, so that the engine will be equally efficient when rotating in either direction.

Formed in the inner surface of the rear head 3 are radial corrugations 30, which, as the engine rotates in either direction, will operate in an obvious manner to direct the steam coming into contact therewith against the rear edges of the vanes of the engine in such manner as to supplement the action of the jets from the admission ports, thus materially increasing the efficiency of the engine.

To provide for the escape of the driving fluid from the casing, I provide exhaust ports 31 in the rear head 3 of the engine casing which communicate with an annular chamber 32 formed in said head, said chamber being provided with a discharge or exhaust pipe 33. The ports 31 are equal in number to the steam chests 17 and are located centrally between said steam chests. This construction provides for expansion of the driving medium from the time it enters the engine until it reaches the exhaust ports 31 and said exhaust ports being located equidistant between said steam chests, it is obvious that the same expansion of the driving fluid will be obtained whether the engine rotates in one direction or the other, thus rendering the driving conditions uniform in both directions and insuring equal efficiency of the engine when rotating in either direction.

While I have herein shown four steam chests 17 and four exhaust ports 31, it is obvious that their number may be varied as desired to meet different requirements.

I claim:—

1. In a turbine engine, the combination of a casing comprising a shell and heads therefor provided with shaft bearings, a shaft mounted to rotate in said bearings, a drum secured to rotate with said shaft inside of said casing, said drum comprising a central hub and vanes secured to the perimeter thereof, a plurality of driving fluid chests on the front casing head, provided with chambers connected to form different series, the chambers of different series being provided, respectively, with inclined ports, the ports of each series of chambers being inclined in the same direction and of different series in opposite directions.

2. In a turbine engine, the combination of a casing comprising a shell and heads therefor provided with shaft bearings, a shaft mounted to rotate in said bearings, a drum secured to rotate with said shaft, said drum comprising a central hub and vanes secured to the perimeter thereof, said vanes comprising a plurality of series, a plurality of driving fluid chests on the front casing head each provided with chambers which extend over the different series of vanes and which are connected to form different series, the different series of chambers being provided, respectively, with inclined ports for each series of vanes, the ports of each series being inclined in the same direction and of different series in opposite directions.

3. In a turbine engine, the combination of a casing comprising a shell and heads therefor provided with shaft bearings, a shaft mounted to rotate in said bearings, a drum secured to rotate with said shaft inside of said casing, said drum comprising a central hub and vanes secured to the perimeter thereof, a plurality of driving fluid chests on the front casing head, provided with chambers connected to form different series, the chambers of different series being provided, respectively, with inclined ports, the ports of each series being inclined in the same direction and of different series in opposite directions, a supply pipe connected to both of said series of chambers and means for controlling said supply pipe, whereby communication thereof with either of said series of chambers may be separately effected.

4. In a turbine engine, the combination of a casing comprising a shell and heads therefor provided with shaft bearings, a shaft mounted to rotate in said bearings, a drum secured to rotate with said shaft inside of said casing, said drum comprising a central hub and vanes secured to the perimeter thereof, a plurality of driving fluid chests on the front casing head, provided with chambers connected to form different series, the chambers of different series being provided, respectively, with inclined ports, the ports of each series of chambers being inclined in the same direction and of different series in opposite directions, a supply pipe connected to both of said series of chambers and a three-way cock for controlling said supply pipe whereby communication thereof with either of said series of chambers may be separately effected.

5. In a turbine engine, the combination of a casing comprising a shell and heads therefor provided with shaft bearings, a shaft mounted to rotate in said bearings, a drum secured to rotate with said shaft inside of said casing, said drum comprising a central hub and vanes secured to the perimeter thereof, a plurality of driving fluid chests on the front casing head, provided with chambers connected to form different series, the chambers of different series being provided, respectively, with inclined ports, the ports of the same series of chambers being inclined in the same direction and of different series in opposite directions, and the rear head of the engine casing being provided with exhaust ports located equidistant between the steam chests on the front casing head, whereby the engine will work on the same expansion in both directions of rotation.

6. In a turbine engine, the combination of a casing comprising a shell and heads therefor provided with shaft bearings, a shaft mounted to rotate in said bearings, a drum secured to rotate with said shaft inside of said casing, said drum comprising a central hub and vanes secured to the perimeter thereof, a plurality of driving fluid chests on the front casing head, provided with chambers connected to form different series, said chambers being provided with inclined admission ports to the engine casing, and the inner surface of the rear head of the engine casing being provided with radial corrugations adapted to project the driving fluid against the rear edges of the vanes so as to supplement the action of the jets from the admission ports.

7. In a turbine engine, the combination of a casing comprising a shell and heads therefor provided with shaft bearings, a shaft mounted to rotate in said bearings, a drum secured to rotate with said shaft inside of said casing, said drum comprising a central hub and vanes secured to the perimeter thereof, said vanes being arranged in groups comprising a central vane and vanes at opposite sides thereof which terminate at a shorter distance from the front head of the engine casing than said central vane.

8. In a turbine engine, the combination of a casing comprising a shell and heads therefor provided with shaft bearings, a shaft mounted to rotate in said bearings, a drum secured to rotate with said shaft inside of said casing, said drum comprising a central hub and vanes secured to the perimeter thereof, said vanes being arranged in groups comprising vanes at opposite sides of a central vane which terminate at successively shorter distances from the front head of the engine casing.

In testimony, that I claim the foregoing as my invention, I affix my signature in presence of two subscribing witnesses, this 17th day of February, A. D. 1908.

ARTHUR C. WOOD.

Witnesses:
K. A. COSTELLO,
M. V. MCGRATH.